Sept. 2, 1930.  G. B. STARKWEATHER  1,774,677
AIRCRAFT
Filed Oct. 17, 1927  3 Sheets-Sheet 1
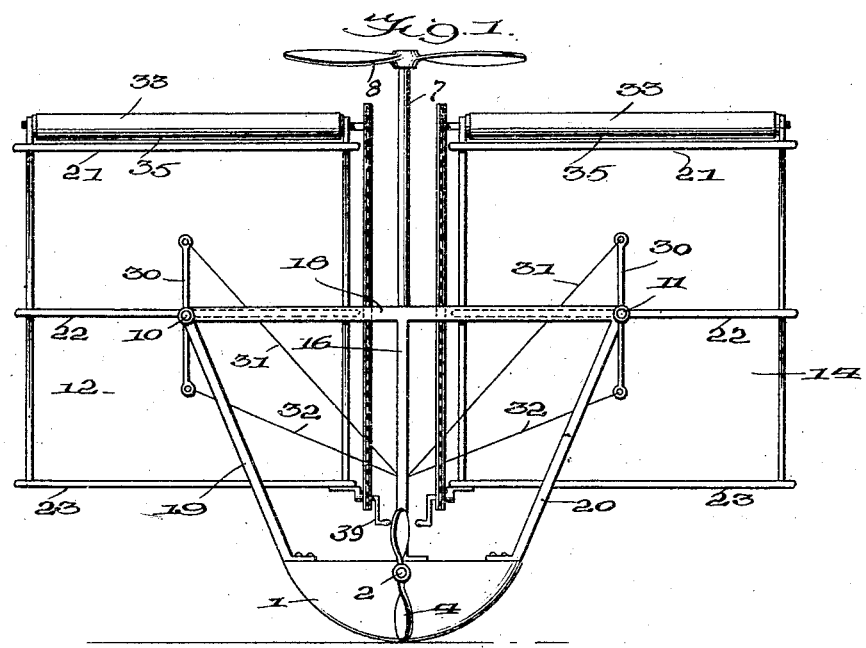
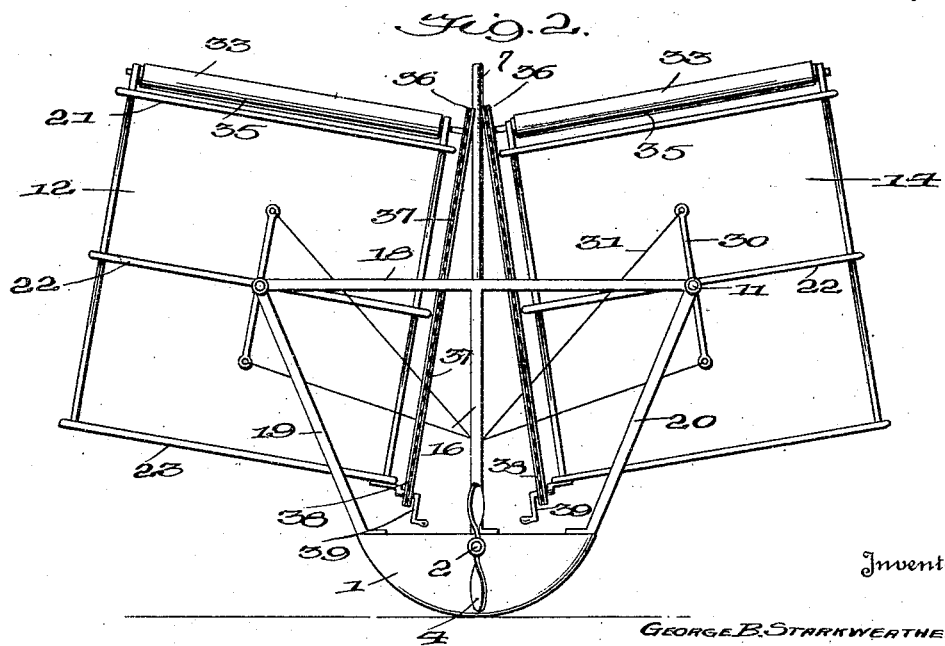
Inventor
GEORGE B. STARKWEATHER,
By
Attorney

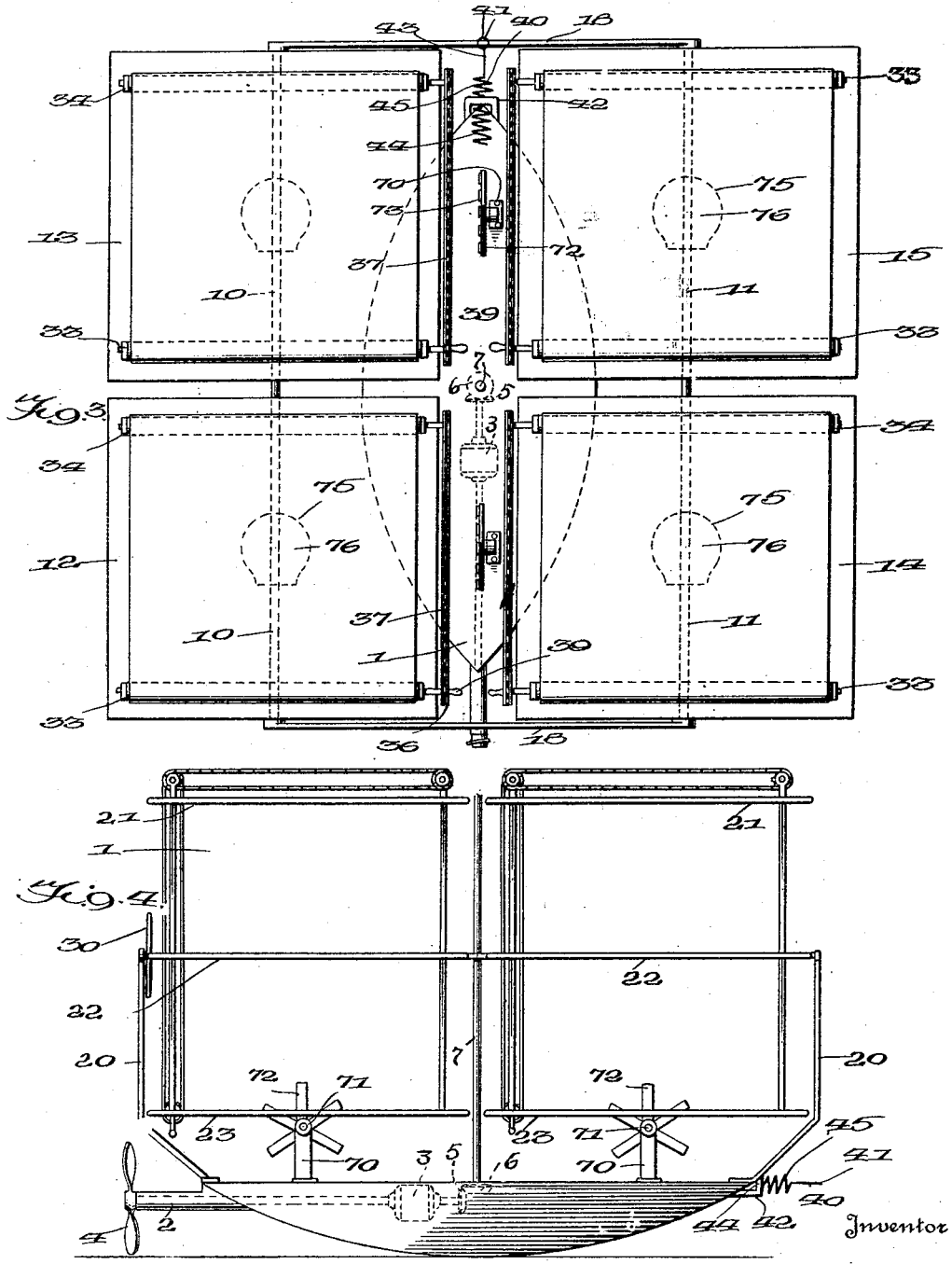

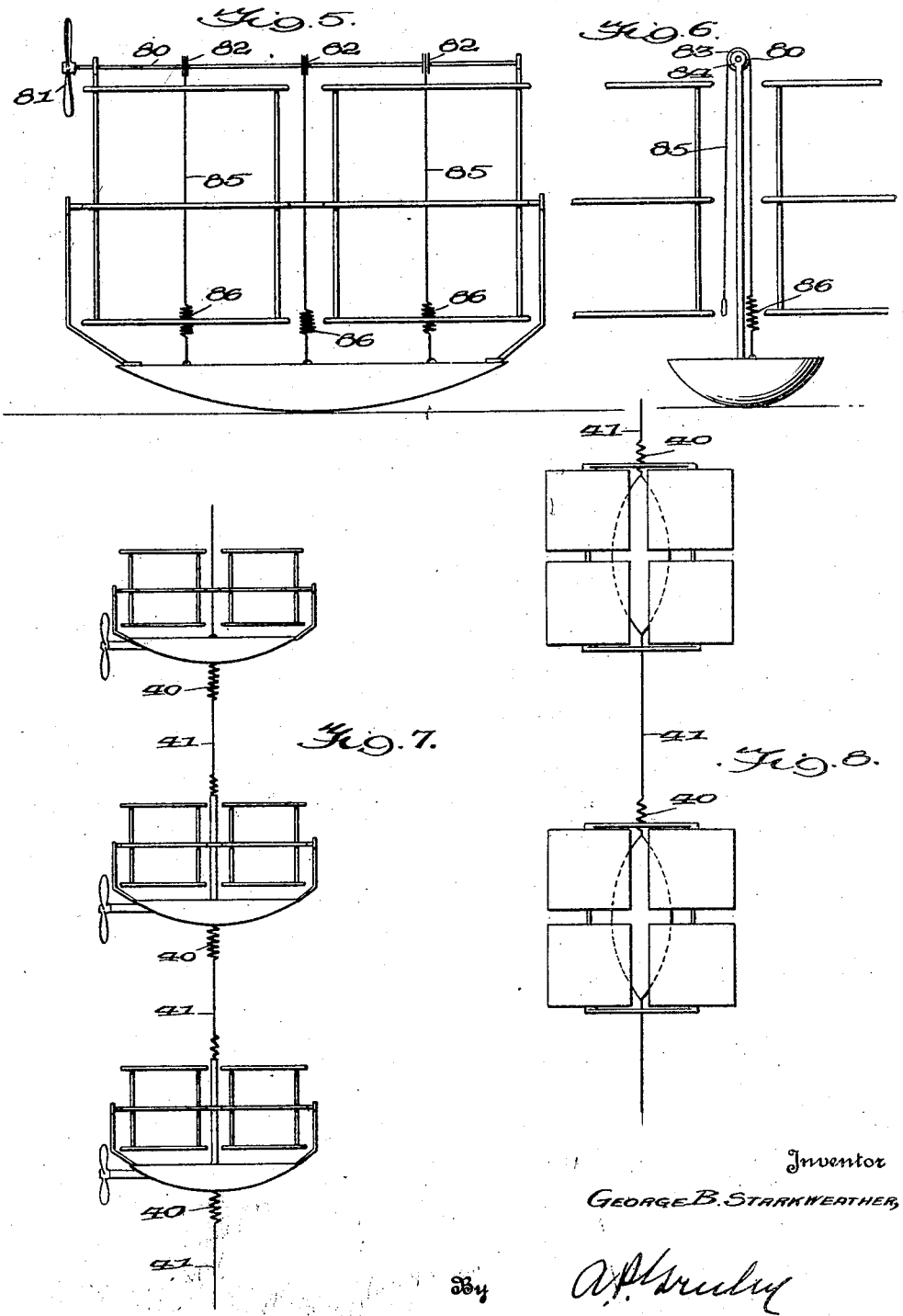

Patented Sept. 2, 1930

1,774,677

UNITED STATES PATENT OFFICE

GEORGE B. STARKWEATHER, OF WASHINGTON, DISTRICT OF COLUMBIA, ASSIGNOR TO PAUL STARKWEATHER, TRUSTEE, OF WASHINGTON, DISTRICT OF COLUMBIA

AIRCRAFT

Application filed October 17, 1927. Serial No. 226,624.

My invention relates to aircraft heavier than air and has for its object to provide improvements calculated to safeguard the lives of pilots and passengers and to avoid the fatalities which are so common at the present day in the navigation of the air.

The present application is particularly directed to subject matter shown and described but not claimed in an application filed by me January 11, 1926, Serial No. 80,533, on which a patent was issued as No. 1,645,779 on October 18, 1927, particularly as regards certain stabilizing devices carried by the body or hull and certain stabilizing or energizing devices carried by the wings originally claimed in said application, the claims therefor being cancelled from said application in response to a requirement for division.

The present application has for a further object to provide in place of the rigidly fixed wings of the usual aeroplane, cellular structures each carrying one or more plane or wing members arranged to be tilted on axis parallel with the longitudinal axis of the body or hull and so arranged that while the plane or wing members are normally held horizontal or nearly so, the cellular structures may be tilted on their axes to cause their plane or wing members to assume a position inclined more or less to the horizontal and approaching the vertical so as to lessen the sustaining or lifting power and permit rapid descent of the aeroplane bodily downward on an even keel thus overcoming any tendency to go into a tail spin or to plunge downward head on, the tilting of the cellular structures also facilitating the rapid ascent of the aeroplane under the influence of a helicopter or lifting force exerted through a rope or wire connection from another aeroplane.

A further object of the invention is to provide means by which to an aeroplane which may be provided with particularly powerful engines may be connected other aeroplanes or gliders, either above, below or to the rear of the high powered towing aeroplane, so that the high powered aeroplane may be used to lift or to sustain in elevated position other aeroplanes, thus making it possible to park a number of aeroplanes in the air.

A further object of my invention is to provide means by which the manual or foot power of passengers or others either collectively or individually may be made use of to operate an auxiliary propeller or other auxiliary device, such means also serving to afford exercise to the passengers.

With the objects above indicated and other objects hereinafter explained in view my invention consists in and comprises the construction and combination of elements hereinafter described and claimed.

Referring to the drawings:

Figure 1 is a front end view of an aeroplane embodying my invention with the cellular wing structures in normal positon.

Figure 2 is a view similar to Figure 1, but showing the cellular wing structures in tilted position.

Figure 3 is a top plan view of the aeroplane shown in Figures 1 and 2.

Figure 4 is a side view of the same.

Figures 5 and 6 are respectively a central, longitudinal, sectional view and a cross sectional view of my aeroplane showing an auxiliary propelling means adapted to be operated by hand power.

Figure 7 is a side view of a group or fleet of aeroplanes connected to a main aeroplane above them, and Figure 8 is a plan view of a group or train of aeroplanes connected to a towing aeroplane.

In the drawings 1 indicates the boat shaped body or hull of my aeroplane, 2 indicates the main shaft driven by motor 3 carrying at its forward end propeller 4 and connected in any convenient manner as by bevel gear 5, 6, with a vertical shaft 7 near but somewhat forward of the centre of the body or hull, carrying at its upper end a helicopter or lifting propeller 8, the construction thus described being that shown and described in my Patent No. 1,645,779, above referred to. The body or hull 1 is also provided with the stabilizers shown and described in my said patent each consisting of hub 71 with radial spokes 72 carried in supports 70 secured to the deck strip of the body, each of the radial spokes being provided with a flag-like piece of thin material, preferably sheet metal having more or less resilience, extending tangentially from it. One of these stabilizers is preferably arranged near the forward end of the body or hull, and the other near its rear end, and they may be free to be rotated by the air current as the aeroplane passes through the air, or may be positively driven by any convenient means. As regards these stabilizers and the openings 75 in the wings with their covers 76 hereinafter more fully described, this application as partially directed to subject matter shown and described, but not claimed in my application No. 80,533, filed January 1, 1926, on which was issued Patent No. 1,645,779, above referred to.

A suitable frame work extending upward from the body or hull 1 supports bearings for longitudinal axial shafts 10 and 11 on which are carried respectively interchangeable cells 12 and 13, on axial shaft 10, and 14 and 15, on axial shaft 11. The supporting framework for these axial shafts may be of any suitable construction but is here shown as comprising central uprights 16 and 17, horizontal bars 18 extending laterally in both directions from the upper ends of these uprights 16 and 17, and inclined braces 19 and 20, extending from the deck plate of the body or hull 1 to the outer ends of the cross bar 18.

The cells 12, 13, 14, and 15 are alike in construction and are intended to be interchangeable and description of one will be sufficient. It comprises a light framework rectangular in shape viewed from front or rear and while here shown as of a length equal to its height and width, may be longer. This framework carries a plurality of wing or lifting plane members here shown as three in number, an upper member 21, an intermediate member 22 and a lower member 23, suitably spaced apart and constituting in effect a triplane lifting wing. In the construction shown there are two of these cells on each side of the centre of the aeroplane but more than two may be used and if desired a second set of cells may be arranged above the set shown.

These cells are arranged to be rotated on their axes 10 and 11 as indicated in Figure 2 so as to cause their wing members to be inclined more or less out of the horizontal to lessen their sustaining power and thus permit the aeroplane to descend in a vertical line or in a line more nearly vertical than is permitted by the rigid wings usually employed on aeroplanes, or to be drawn upward by the helicopter or other means.

Any convenient means for rotating the cells on their axes 10 may be used. The means here shown comprises a rod 30 extending upward and downward from the axial shaft 10 and having connected to its ends cords 31 and 32 leading to the body or hull 1, the ends of which may be secured to suitable cleats (not shown).

Mounted in suitable bearings carried by the framework of each cell above the upper plane member 21 are rollers 33 at the forward end of the plane member, and 34 at the rear end. These rollers as shown each extend from the inner to the outer edge of the plane member and carry a belt or sheet 35 of the full width of the plane member but the rollers may be of less length and the belt may be of less width if desired. Any convenient means for rotating one of the rollers 33 or 34 to cause the belt or sheet 35 to move over the surface of the plane members may be used. As shown the means for this purpose comprises a pulley 36 on the shaft of rollers 33 and 34 carrying a belt 37 from a pulley 38 near the inner edge of the lower plane member 23 and a crank 39 for operating this pulley so arranged as to be in reach of a person sitting or standing in the hull or body 1. By operating this crank 39 the belt or curtain 35 may be moved over the upper surface of the upper plane member to carry off snow or sleet or other foreign matter which might otherwise accumulate on the plane members and tend to force the aeroplane down by its weight.

The upper plane members 21, and if desired the intermediate plane members 22 and the lower plane members 23 are preferably each provided with one or more openings or stabilizing apertures 75, here shown as circular, each provided with a cover 76 slightly less in area than the aperture 75 and resiliently secured at its forward edge to the material of the plane member to the forward edge of the opening 75, the cover being normally held by the elasticity of the material of which it is formed in the aperture 75 in line with the main portion of the plane member, but being free to swing upward or downward in response to air currents and to thus aid in stabilizing. The cover 76 on one wing being closed checks the upward swing of that wing and consequently checks the downward swing of the opposite wing.

At the rear end of the hull or body 1, and preferably at such other points as may be found desirable at the forward end, at the right and left and above and below, is arranged a coupling attachment 40 adapted to receive the end of a wire or other rope, 41, for connecting the aeroplane with one or more other aeroplanes or gliders so that the aeroplane shown may serve as an aerial tow-boat to tow with it through the air one or more such aeroplanes or gliders. The attachment 40 may be of any desired construction which will afford the resilience necessary to avoid undue strain on the tow rope or wire 41. A convenient means for this purpose may be a U-shaped bracket 42 having the ends of its legs secured to the body or hull 1, and having in its midportion an opening for a rod 43 with coiled springs 44 and 45 bearing at one end against the midportion of the bracket and secured at their other ends to the ends of rod 44.

When a high powered aeroplane is used for towing other aeroplanes or gliders as indicated in Figure 8, the resilient attachment 40 at the rear end or stem of the towing aeroplane will be made use of and will be connected by tow ropes or wire 41 with a resilient attachment 40 at the forward end of a second aeroplane the resilient attachment 40 at the rear end of which is connected by a second tow rope or wire 40 to the resilient attachment at the forward end of a third aeroplane, and so on, the number of aeroplanes thus connected depending on the power of the towing aeroplane.

It is to be understood that the engines of the aeroplanes which are towed may be operated to assist in propulsion of what may be termed the train so that the engine or engines of the towing aeroplane may be to some extent relieved of the towing strain.

In the arrangement shown in Figure 7, a resilient attachment 40 located in the bottom of the body or hull 1 of the uppermost aeroplane will be connected by rope or wire 41 with a resilient attachment 40 on the upper end of a suitable mast extending upward from the centre of gravity of the next lower aeroplane and the third or lowermost aeroplane will be connected by means of rope or wire 41 leading from a resilient attachment 40 in its bottom to a resilient attachment at the upper end of a mast on the lowermost aeroplane and from the resilient attachment 40 in its bottom a wire or rope 41 may lead to a suitable anchorage. By means of this arrangement a number of aeroplanes may be parked in the air from a single anchorage.

In Figures 5 and 6 I have shown means by which the manual power of passengers may be utilized to operate auxiliary propellers or stabilizing devices if for any reason the engine power should fail, or for aiding the propulsion of the engine driven propeller. These devices also afford exercise to the passengers to relieve the tedium of inaction. The devices as shown comprise a horizontal shaft 80 supported on the frame work above the cellular wing structures with a propeller 81 at its forward end and with a series of pulleys 82 loosely mounted on it each provided with a pawl 83 adapted to engage a ratchet wheel 84 fast on the shaft. A cord 85 passes about each pulley, one end being secured to a spring 86 and the other end hanging down in position to be grasped by the hand of a passenger seated in the body or hull 1. By pulling downward on this cord the shaft 80 will be rotated and on release of the cord it will be drawn up by spring 86. Any other operating means by which the cord when pulled down will operate the shaft and when released will return to initial position without effecting any reverse rotation of the shaft may be used.

Having thus described my invention what I claim is:—

1. In aircraft having laterally extending wings each provided with an opening and a cover of thin material of less area than the opening freely movable therein and resiliently secured to its forward edge.

2. In aircraft having a body or hull and a framework carried thereby, supporting means comprising a structure carrying an upper and a lower wing member pivotally mounted in the framework on a longitudinal axis midway between its inner and outer ends, on a longitudinal axis midway between the wing members and on a line midway between their side edges.

3. In aircraft having a body or hull and a framework carried thereby, supporting means comprising a structure carrying an upper and lower wing member pivotally mounted in the framework on an axis midway between its inner and outer ends and extending longitudinally of the hull or body midway between the wing member and on a line midway between their side edges, and means for tilting said wing carrying structure.

4. In aircraft having a body or hull and a framework extending laterally to right and left therefrom, supporting means comprising structures each carrying an upper and a lower wing member pivotally mounted in the framework at right and left of the longitudinally central line of the body or hull on axes midway between their inner and outer ends, on axes midway between the wing members and on a line midway between their side edges, and means for separately tilting each of the wing carrying structures.

5. In aircraft having a body or hull and a framework extending laterally to right and left therefrom, supporting means comprising structures each carrying an upper and a lower wing member pivotally mounted in the framework at right and left of the longitudinally central line of the body or hull on axes midway between their inner and outer ends, on axes midway between the upper and lower wing members and on a line midway between their side edges, and means for separately tilting said wing carrying structures.

6. In an aircraft having a body or hull and a framework extending laterally to right and left therefrom supporting means comprising a plurality of structures each carrying an upper and a lower wing member pivotally mounted in the framework at right and a plurality of structures pivotally mounted at left of the longitudinally central line of the body or hull on axes midway between their inner and outer ends, each of said structures pivoted on a longitudinal axis midway between its upper and lower wing member and on a line midway between their side edges.

7. In an aircraft having a body or hull and a framework extending laterally to right and left therefrom, supporting means comprising a plurality of structures pivotally mounted in the framework at right and a plurality of structures pivotally mounted at left of the longitudinally central line of the body or hull on axes midway between their inner and outer ends, each of said structures carrying an upper and a lower wing member and pivoted on a longitudinal axis midway between their side edges.

8. In an aircraft having a body or hull and a framework extending laterally to right and left therefrom, supporting means comprising a plurality of structures pivotally mounted in the framework at right and a plurality of structures pivotally mounted at left of the longitudinally central line of the body or hull on axes midway between their inner and outer ends, each of said structures carrying a plurality of wing members arranged one above an upper and a lower wing member each of said structures being pivoted on an axis midway between the upper and lower wing members on a line midway between their side edges and means for tilting said structures on their axes.

9. In aircraft having a body or hull, a framework extending laterally therefrom, a structure carrying an upper and a lower wing member, pivotally mounted to swing on an axis midway between the upper and lower wing members and on a line midway between their side edges, said framework and means for protecting the wing members from snow or sleet comprising a sheet of material adapted to extend over the upper surface of said upper wing member and means for moving said sheet to carry off snow or sleet deposited on it.

In testimony whereof, I hereunto affix my signature.

GEORGE B. STARKWEATHER.